US 7,095,746 B1

(12) United States Patent
Frei

(10) Patent No.: US 7,095,746 B1
(45) Date of Patent: Aug. 22, 2006

(54) METHOD AND APPARATUS FOR SUB-NETWORK DEVICES WITHOUT DIRECT LAYER-2 COMMUNICATION AND COUPLED TO A COMMON FORWARDING AGENT INTERFACE TO COMMUNICATE THROUGH LAYER-3

(75) Inventor: Randall Wayne Frei, Santa Clara, CA (US)

(73) Assignee: Arris International, Inc., Suwanee, GA (US)

( * ) Notice: Subject to any disclaimer, the term of this patent is extended or adjusted under 35 U.S.C. 154(b) by 1032 days.

(21) Appl. No.: 09/594,216

(22) Filed: Jun. 14, 2000

(51) Int. Cl.
*H04L 12/28* (2006.01)

(52) U.S. Cl. .......................... 370/401; 370/389; 714/4

(58) Field of Classification Search ........ 370/229–235, 370/312, 351–357, 367, 389, 390, 391, 392, 370/393, 471, 474, 475, 400–411, 395, 465, 370/466, 216, 217, 218, 242, 245
See application file for complete search history.

(56) References Cited

U.S. PATENT DOCUMENTS

| | | | | |
|---|---|---|---|---|
| 5,732,071 A | * | 3/1998 | Saito et al. | 370/255 |
| 5,781,552 A | * | 7/1998 | Hashimoto | 370/447 |
| 5,790,541 A | * | 8/1998 | Patrick et al. | 370/392 |
| 5,864,535 A | * | 1/1999 | Basilico | 370/231 |
| 5,963,540 A | * | 10/1999 | Bhaskaran | 370/218 |
| 6,130,892 A | * | 10/2000 | Short et al. | 370/401 |
| 6,157,644 A | * | 12/2000 | Bernstein et al. | 370/392 |
| 6,188,689 B1 | * | 2/2001 | Katsube et al. | 370/389 |
| 6,205,148 B1 | * | 3/2001 | Takahashi et al. | 370/401 |
| 6,295,276 B1 | * | 9/2001 | Datta et al. | 370/218 |
| 6,603,769 B1 | * | 8/2003 | Thubert et al. | 370/401 |
| 6,657,974 B1 | * | 12/2003 | Britton et al. | 370/255 |
| 6,728,232 B1 | * | 4/2004 | Hasty et al. | 370/338 |
| 6,747,979 B1 | * | 6/2004 | Banks et al. | 370/401 |
| 6,754,220 B1 | * | 6/2004 | Lamberton et al. | 370/401 |
| 6,779,039 B1 | * | 8/2004 | Bommareddy et al. | 709/238 |

OTHER PUBLICATIONS

David C. Plummer, An Ethernet Address Resolution, Nov. 1982.
Multi-LAN Address Resolution, Oct. 1984.

* cited by examiner

*Primary Examiner*—Chi Pham
*Assistant Examiner*—Phuc Tran

(57) ABSTRACT

Layer-3 communication, within a sub-network using a common forwarding agent's sub-network interface and without layer-2 communication, is enabled by a network device configured with the MAC address of the forwarding agent. The network device intercepts an ARP request from a sending device intended for a receiving device. The network device sends an ARP reply containing the MAC address of the forwarding agent to the sending device. The forwarding agent receives the ARP reply and forwards data-packets received from the sending device to the receiving device through layer-3.

25 Claims, 4 Drawing Sheets

US 7,095,746 B1

METHOD AND APPARATUS FOR SUB-NETWORK DEVICES WITHOUT DIRECT LAYER-2 COMMUNICATION AND COUPLED TO A COMMON FORWARDING AGENT INTERFACE TO COMMUNICATE THROUGH LAYER-3

FIELD OF INVENTION

The invention relates to communication on a sub-network, particularly layer-3 communication between sending and receiving devices on a sub-network without layer-2 communication.

BACKGROUND OF INVENTION

Conventional communication systems connect thousands of personal computers (PCs) and other network devices adapted to communicate using the open system interconnection (OSI) model. Often, a smaller number of computers are linked to form a local area network (LAN), or a wide area network (WAN). LANs, WANs, and other networks are generally referred to as sub-networks. One larger communication network is the Internet, which interconnects millions of computers, LANs, WANs and other sub-networks.

To communicate between devices within a sub-network, a sending device (e.g., computer) may send an address resolution protocol (ARP) request to the sub-network to find a destination device (e.g., computer). ARP is the process of mapping a network address to a media access control (MAC) address. The ARP request is broadcast to the sub-network. The ARP request is received and processed by all sub-network devices; but only the intended destination device replies. In response to the ARP request from the sending device, the destination device sends an ARP reply to the sending device. The ARP reply from the destination device contains the MAC address of the destination device and Internet protocol (IP) network address. The sending device receives the ARP reply containing the destination device MAC address. Through network protocols, the sending device parses the ARP reply and determines the destination MAC and IP address. With knowledge of the destinations MAC and IP addresses, the sending device transmits data-packets of information directly to the destination device.

As members of a sub-network communicate, network protocols enable MAC addresses of other members on the same sub-network to become known. Unfortunately, knowledge of MAC addresses enables "looking" into, or manipulating, another member computer, or computer files. For example, a sub-network member can be disguised as another member in order to intercept data-packets (i.e., "spoofing"). Therefore, the current OSI model and use of ARP allows for direct communication between members of a sub-network at the expense of sub-network privacy. Accordingly, it is desirable for sub-network members to communicate while enabling sub-network privacy.

SUMMARY OF INVENTION

The invention enables sub-network members without layer-2 communication coupled to a common forwarding agent's sub-network interface, to communicate using layer-3 communication. For example, in a sub-network without layer-2 communication, a sending device, using the same forwarding agent's sub-network interface as a receiving device, sends an ARP request to the sub-network to learn the MAC address of the receiving device. A network device configured with the forwarding agent's MAC address and P2ARP function is interconnected between a sending device and forwarding agent. The P2ARP function is adapted to: intercept the ARP request from the sending device, examine the IP address of the receiving device, and send an ARP reply including the MAC address of the forwarding agent to the sending device. The sending device, upon receiving the ARP reply, forwards data-packets intended for the receiving device to the forwarding agent through layer-3. The forwarding agent, upon receiving the data-packets from the sending device, forwards the data-packets to the receiving device.

Aspects of the preferred embodiment pertain to specific method steps implimentable on a device adapted to use a program. The program defining the functions of the preferred embodiment can be provided to a network device via a variety of signal-bearing media. Such signal-bearing media, when carrying computer-readable instructions that direct the functions of the invention, represent alternative embodiments of the invention.

DETAILED DESCRIPTION OF INVENTION

Preferred embodiments of the invention include a method and apparatus for allowing sub-network members without layer-2 communication and coupled to a common forwarding agent's sub-network interface, to communicate through layer-3. Aspects of the preferred embodiment pertain to specific method steps implimentable on a device adapted to use a program. The program defining the functions of the preferred embodiment can be provided to a network device via a variety of signal-bearing media. Such signal-bearing media, when carrying computer-readable instructions that direct the functions of the invention, represent alternative embodiments of the invention.

Figure 1:
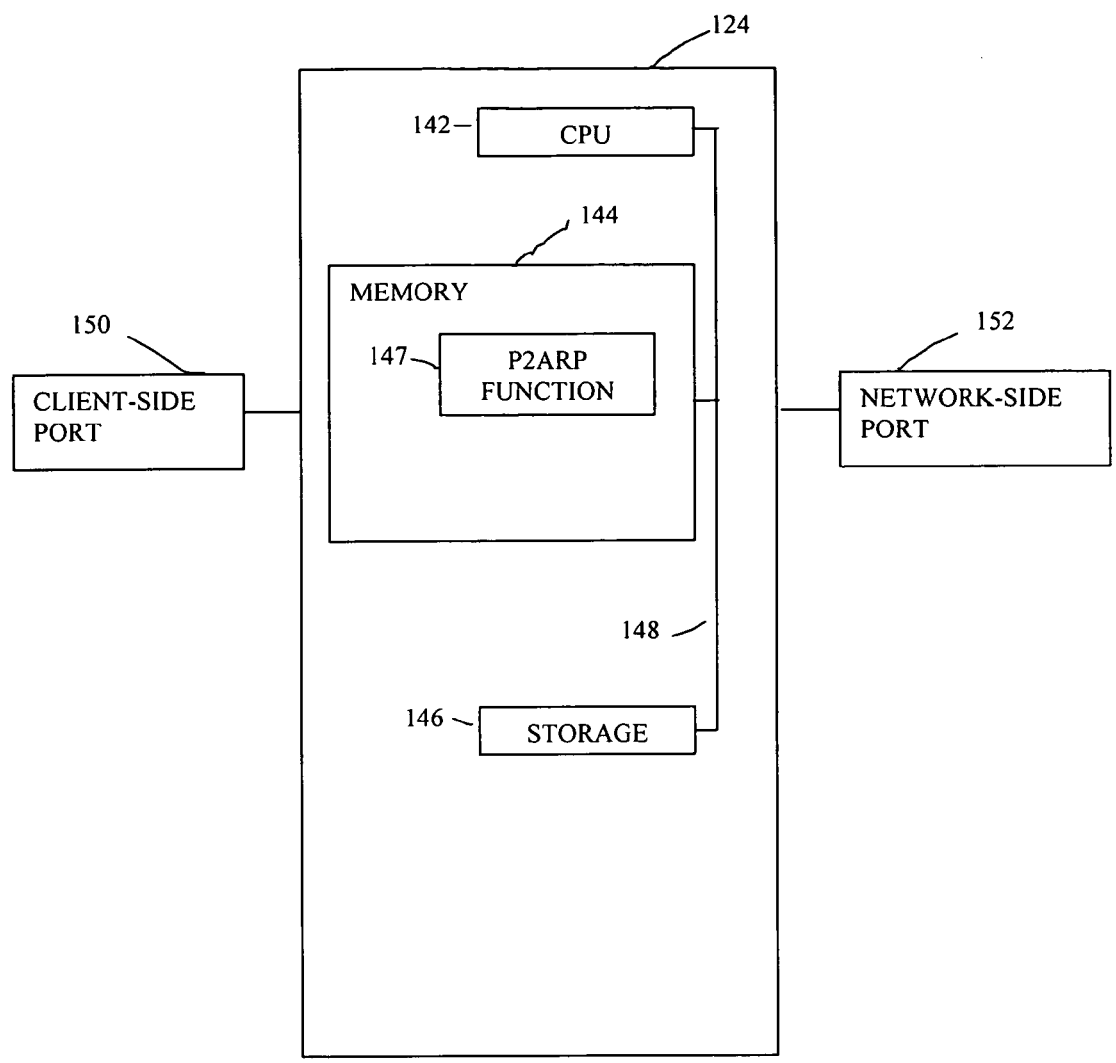
FIG. 1 is a simplified system diagram illustrating functional components of a P2ARP device relevant to the present invention.

FIG. 1 depicts a proxy—proxy address resolution protocol (P2ARP) device 124. The P2ARP device 124 comprises: a central processing unit (CPU) 142, storage 146, memory 144, client-side port 150 and network-side port 152 for interconnection to a network. Memory 144 is a random access memory sufficiently large to hold P2ARP function 147 as described in FIG. 2. The P2ARP function 147 may be accessed and executed by the CPU 142 as needed during operation.

FIG. 1 is only one hardware configuration for the P2ARP device 124. A preferred embodiment of the invention can apply to any comparable hardware configuration, regardless of whether the computer system is a multi-user computing apparatus, a single-user workstation, or network appliance that does not have non-volatile storage.

Figure 2:
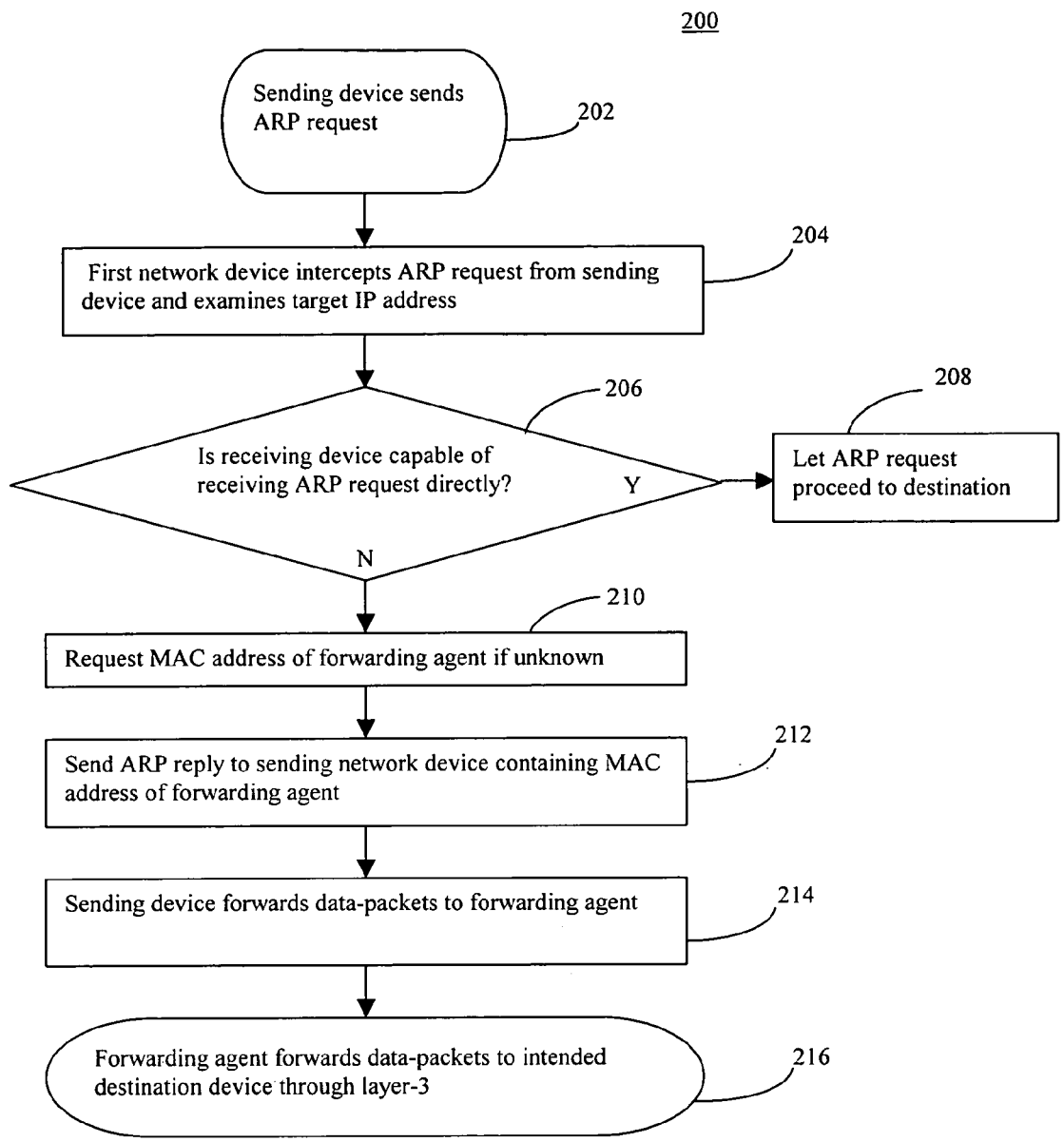
FIG. 2 is a flow chart showing functional steps associated with P2ARP function in accordance with the present invention.

FIG. 2 illustrates a flow diagram of a method 200 for allowing sub-network members without layer-2 communication and coupled to a common forwarding agent's sub-network interface, to communicate through layer-3. When necessary, FIG. 1 is referenced in the following discussion of FIG. 2. Specifically, FIG. 2 illustrates the P2ARP function 147 included within P2ARP device 124. The P2ARP function 147 is adapted to: receive an ARP request from a sending device, interpret the ARP request, and send a ARP reply including the MAC address of forwarding agent to the sending device.

The method 200 begins when a sending device initiates communication with a receiving device on sub-network by sending an ARP request to the sub-network at 202. The P2ARP function 147 intercepts the ARP request and interprets the ARP request to determine the destination IP address of the receiving device at 204.

Often, a network administrator may configure portions of the sub-network to communicate via layer-2. Other devices, such as servers and routers, communicate at layer-2. In a preferred embodiment, the P2ARP function 147 at 206 determines, using the IP address of the receiving device, if the sending and receiving devices can communicate through layer-2. If the P2ARP function 147 determines the sending and intended receiving device can communicate through layer-2, the ARP request is allowed to proceed to the sub-network at 208. If sending and receiving devices are unable to communicate through layer-2, the P2ARP function 147 proceeds to 210 to initiate the process of sending an ARP reply to the sending device.

The P2ARP function 147 requests the MAC address of the forwarding agent if unknown at 210. At 212, the P2ARP function 147 sends an ARP reply including the MAC address of the forwarding agent, to the sending device. Upon receiving the ARP reply at 212, the sending device at 214 forwards data-packets from the sending device to the forwarding agent. The data-packets from the sending device contain the MAC of forwarding agent and IP addresses of the destination device. The forwarding agent receives from the sending device, intended for the destination device, and forwards the data-packets at 216 to the destination device using layer-3.

Figure 3:
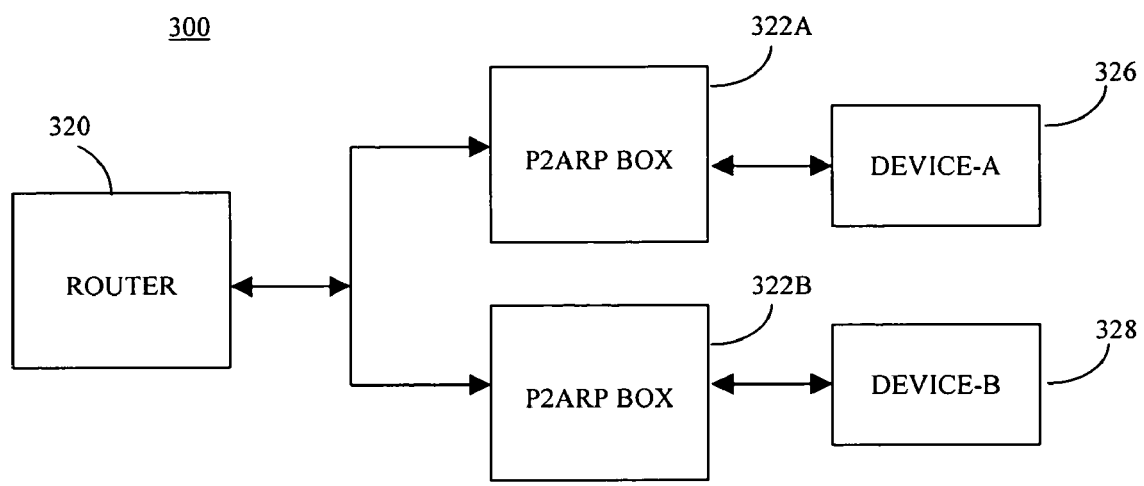
FIG. 3 is simplified sub-network system diagram, illustrating sub-network system architecture relevant to the present invention, using P2ARP devices interconnected to router 320.

FIG. 3 illustrates an embodiment of the system to enable layer 3 communication for sub-network members without layer 2 communication and coupled to a common forwarding agent's sub-network interface. As necessary, FIGS. 1 and 2 are referenced in the following discussion of FIG. 3. Specifically, FIG. 3 illustrates the use of a P2ARP device 124 described in FIG. 1 including P2ARP function 147 as shown in FIG. 1 and described in method 200 of FIG. 2, within a sub-network 300. Device-A 326 and device-B 328 are members of, and connected to, a local sub-network 300.

Device-A 326 sends an ARP request to sub-network 300 in order to locate device-B. The ARP request is intercepted by a P2ARP device 322A configured with the MAC address of router 320 (i.e., forwarding agent), and the P2ARP function 147. If the P2ARP device 322A does not contain the MAC address of the router 320, it requests the MAC address of router 320 from the sub-network 300. Upon receiving the ARP request, P2ARP device 322A examines the request to determine the IP address of device-B 328. P2ARP device 322A uses the IP address of device-B 328, to determine if device-A 326, and device-B 328, can directly communicate through layer-2. If P2ARP device 322A determines device-A 326 and device-B 328 can communicate through layer-2, the ARP request is passed through to sub-network 300. If device-A 326 and device 328 cannot communicate at layer-2, P2ARP device 322A sends a ARP reply to device-A 326 containing the MAC address of router 320. If the P2ARP device 322A does not have the MAC address of router 320, the P2ARP device requests the MAC address of router 320.

Upon receiving the ARP reply, device-A 326 sends data-packets, intended for device-B 328, to router 320. Upon receiving data-packets intended for device-B 328, from device-A 326, router 320 forwards the data-packets to device-B 328 through layer-3.

Figure 4:
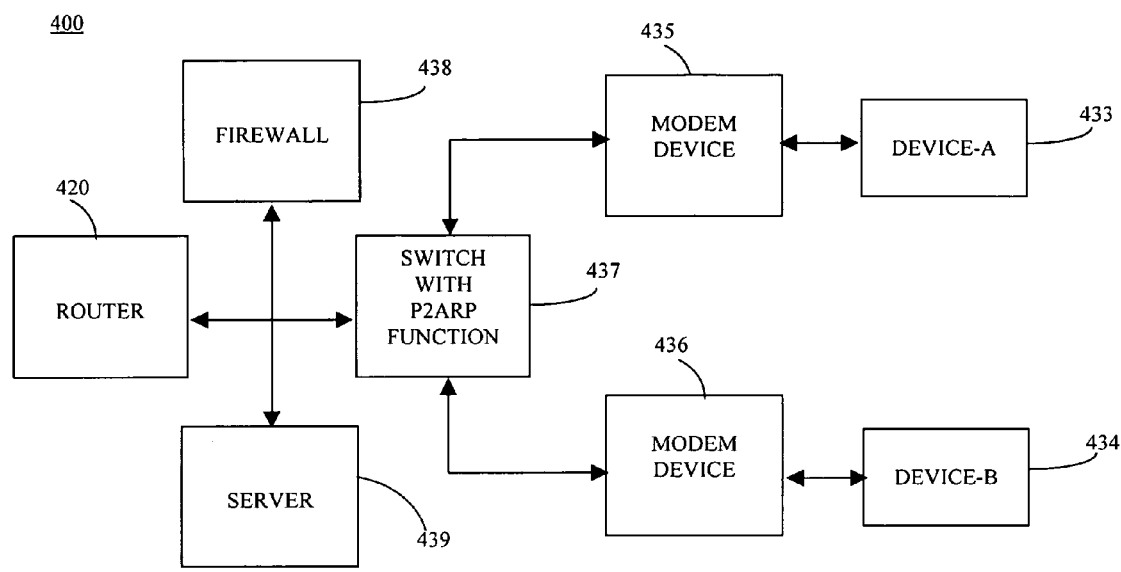
FIG. 4 is simplified sub-network system diagram, illustrating sub-network system architecture relevant to the present invention, including switch 437, router 320, server 439, and firewall 438.

FIG. 4 illustrates an embodiment of the system to enable layer 3 communication for sub-network members without layer 2 communication and connected to a common forwarding agent's sub-network interface. As necessary, FIGS. 1 and 2 are referenced in the following discussion of FIG. 4. Specifically, FIG. 4 illustrates an embodiment using a switch 437, within a sub-network 400, configured to operate as P2ARP device 124 described in FIG. 1 and including P2ARP Function 147 as shown in FIG. 1 and described in method 200 of FIG. 2. Device-A 433 and device-B 434 are members of, and connected to, sub-network 400.

Device-A 433 sends an ARP request for device-B 434. Device-A 433 is connected to network switch 437 through a modem-type device 435. The ARP message is intercepted by switch 437 configured with a MAC address of firewall 438 and P2ARP function 147. If the switch 437 does not contain the MAC address of the firewall 438, it requests the MAC address of the firewall 438 from the sub-network 400. Upon receiving the request, switch 437 determines if device-A 433 and device-B 434 can communicate at layer-2. If switch 437 determines device-A 433 and device-B 434 can communicate directly through layer-2, then the ARP request is allowed through to sub-network 400 through modem device 436. If device-A 433 and device-B 434 cannot communicate through layer-2, switch 437 sends a ARP reply to device-A 433 containing the MAC address of firewall 438. If switch 437 does not have the MAC address of firewall 438, switch 437 requests the MAC address for firewall 438.

Upon receiving the ARP reply, device-A 433 forwards data-packets to firewall 438 using layer-3. The firewall 438 receives and forwards data-packets from device-A 433, to device-B 434 through layer-3.

The above embodiments are only illustrative of the principles of this invention and are not intended to limit the invention to the particular embodiments described. For example, one skilled in the art should recognize that the P2ARP function is configurable within any network device adapted to communicate at layer-2 and is implementable in hardware.

Although the preferred embodiment uses the IP address to determine whether the sending and receiving device may communicate using layer-2, one skilled in the art should recognize that there are other means to determine if the sending device and receiving device can communicate through layer-2.

Accordingly, various modifications, adaptations, and combinations of various features of the described embodiments can be practiced without departing from the scope of the invention as set forth in the appended claims.

What is claimed is:

1. A system for enabling layer-3 communication within a sub-network for those members of the sub-network-without layer-2 communication, the system comprising: a sending device, a receiving device, a forwarding agent, a first network device comprising a media access control address of the forwarding agent, the first network device interprets an address resolution protocol request from the sending device, and sends an address resolution protocol reply comprising the media access control address of the forwarding agent to the sending device;

wherein the forwarding agent comprises network devices able to forward data-packets and communicate through a plurality of network communication layers including layer-3; and wherein the first network device comprises a processor for processing the data-packets, a memory for storing program data-structures associated with the processor, a plurality of storage structures interactive with the processor, and a proxy—proxy address resolution protocol function within the memory and interactive with the processor.

2. The system of claim 1 wherein the first network device comprises a proxy—proxy address resolution protocol function adapted to interpret the address resolution protocol request.

3. The system of claim 1 wherein the first network device comprises a proxy—proxy address resolution protocol function adapted to send a reply to the sending device comprising the media access control address of the forwarding agent.

4. The system of claim 1 wherein the receiving device comprises a network device comprising an internet protocol address and a media access control address.

5. The system of claim 4 wherein the receiving device comprises a computer.

6. The system of claim 1 wherein the first network device comprises a network device adapted to communicate through a plurality of network communication layers including layer-3.

7. The system of claim 6 wherein the first network device comprises a switch.

8. The system of claim 1 wherein the forwarding agent comprises a router.

9. The system of claim 1 wherein the forwarding agent comprises a firewall.

10. A method to enable layer-3 communication within a sub-network for members of the sub-network without layer-2 communication, the method comprising the steps of:

intercepting within a first function an address resolution protocol request from a sending device, the address resolution request intended for a receiving device, the sending and receiving devices being coupled to the sub-network;

determining whether the sending and receiving devices are permitted to communicate with one another via layer-2 communication based on the layer-3 IP address of the receiving device;

replying from the first function to the sending device an address resolution protocol reply comprising a forwarding agent's media access control address if the sending and receiving devices are not permitted to communicate with one another via layer-2 communication;

sending data packets from the sending device to the forwarding agent based on the forwarding agent's layer-2 MAC address; and forwarding the data packets from the forwarding agent to the receiving device based on the layer-3 IP address of the receiving device.

11. The method of claim 10 wherein the first function is included in a first network device adapted to communicate at layer-3.

12. The method of claim 11 wherein the first network device comprises a computer.

13. The method of claim 11 wherein the first network device comprises a proxy—proxy address resolution device.

14. The method of claim 11 wherein the first network device comprises a switch.

15. The method of claim 10 wherein the forwarding agent comprises a network device adapted to communicate through a plurality of communication layers including layer-3.

16. The method of claim 15 wherein the forwarding agent comprises a router.

17. The method of claim 15 wherein the forwarding agent comprises a firewall.

18. A signal-bearing media containing a program to enable layer-3 communication within a sub-network for members of the sub-network without layer-2 communication, the program comprising the steps of:

intercepting within a first function an address resolution protocol request from a sending device, the address resolution request intended for a receiving device, the sending and receiving devices being coupled to the sub-network, determining whether the sending and receiving devices are permitted to communicate with one another via layer-2 communication based on the layer-3 IP address of the receiving device;

replying from the first function to the sending device an address resolution protocol reply comprising a forwarding agent's media access control address if the sending and receiving devices are not permitted to communicate with one another via layer-2 communication;

sending data packets from the sending device to the forwarding agent based on the forwarding agent's layer-2 MAC address; and forwarding the data packets from the forwarding agent to the receiving device based on the layer-3 IP address of the receiving device.

19. The program of claim 18 wherein the first function is included in a first network device adapted to communicate through a plurality of communication layers including layer-3.

20. The program of claim 19 wherein the first network device comprises a computer.

21. The program of claim 19 wherein the first network device comprises a proxy—proxy address resolution device.

22. The program of claim 19 wherein the first network device comprises a switch.

23. The program of claim 18 wherein the forwarding agent comprises a network device adapted to communicate through a plurality of communication layers including layer-3.

24. The program of claim 23 wherein the forwarding agent comprises a router.

25. The program of claim 23 wherein the forwarding agent comprises a firewall.

* * * * *